United States Patent [19]

Lin

[11] Patent Number: 5,594,511
[45] Date of Patent: Jan. 14, 1997

[54] EYEGLASSES WITH A LENS-FRAME BODY WHICH CAN BE SELECTIVELY COUPLED WITH EITHER A PAIR OF BOWS OR A HEAD STRAP

[75] Inventor: Jeng-Ching Lin, Taipei City, Taiwan

[73] Assignee: Mao Lin Enterprise Co., Ltd., Taipei City, Taiwan

[21] Appl. No.: 555,891

[22] Filed: Nov. 13, 1995

[51] Int. Cl.⁶ .............................. G02C 5/14; G02C 3/00
[52] U.S. Cl. .......................... 351/116; 351/111; 351/119; 351/156
[58] Field of Search ............................. 351/118, 119, 351/121, 111, 115, 158, 140, 153, 156, 157, 41, 116; 24/3.3

[56] References Cited

U.S. PATENT DOCUMENTS 4,832,478  5/1989  Salce ........................................ 351/121
5,007,728  4/1991  Magorien ................................. 351/118
5,483,303  1/1996  Hirschman ............................... 351/118

*Primary Examiner*—Hung Dang
*Attorney, Agent, or Firm*—Fitzpatrick, Cella, Harper & Scinto

[57] ABSTRACT

A pair of eyeglasses includes an elongated lens-frame body, two connectors, and a fastener device. The lens-frame body includes two end portions, each of which has a generally vertical hole formed therethrough. Each of the connectors has a front end portion provided with two aligned horizontal lugs which are respectively formed with threaded holes therethrough, and a bolt which extends through the threaded holes of the locking lugs and the hole of a corresponding one of the end portions of the lens-frame body so as to hinge the connectors on the end portions of the lens-frame body. The fastener device is coupled detachably with rear end portions of the connectors so as to retain the lens-frame body on the face of the user.

2 Claims, 4 Drawing Sheets

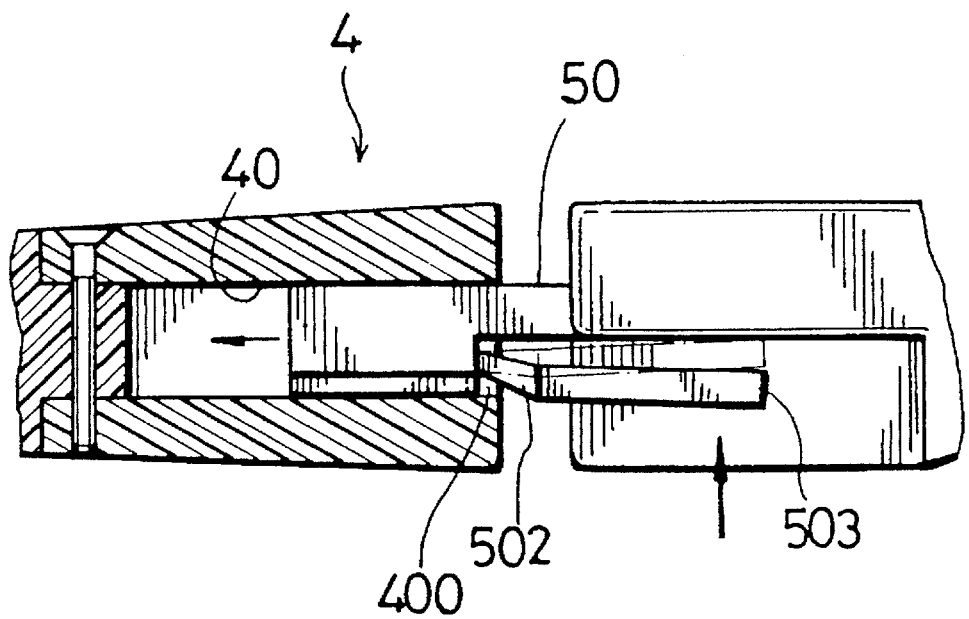
F I G. 4
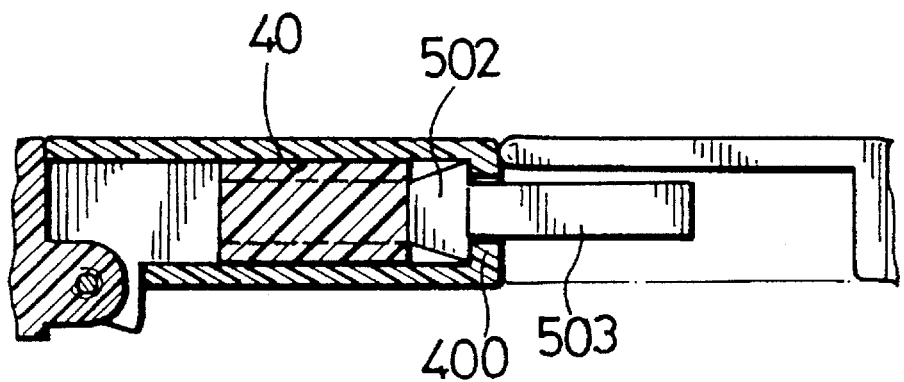
F I G. 5

EYEGLASSES WITH A LENS-FRAME BODY WHICH CAN BE SELECTIVELY COUPLED WITH EITHER A PAIR OF BOWS OR A HEAD STRAP

BACKGROUND OF THE INVENTION

1. Field of the Invention

This invention relates to a pair of eyeglasses, more particularly to one which has a lens-frame body adapted to be selectively coupled with a head strap or a pair of bows by means of two connectors that can be rotated relative to the lens-frame body.

2. Description of the Related Art

Referring to FIG. 1, a pair of conventional eyeglasses includes an eyeglass unit 1 and a pair of bows 2. The eyeglass unit 1 includes an elongated lens-frame body 10 having two spaced lenses 11 disposed therein, and two connectors 12 which project integrally and respectively from two end portions of the lens-frame body 10. Each of the connectors 12 has a vertical hole 120 extending therethrough. Each of the bows 2 has an ear piece 20 formed at the rear distal end thereof and a pivot member 21 formed at the front distal end thereof. Each of the pivot members 21 has two threaded holes 210 and a bolt 22, which extends through the holes 210 of the pivot members 21 and the hole 120 of the lens-frame body 10, so as to mount pivotally the bows 2 on the lens-frame body 10.

Since the connectors 12 and the lens-frame body 10 are formed integrally, the connectors 12 can only be used for connecting the bow 2.

SUMMARY OF THE INVENTION

Therefore, the main object of this invention is to provide a pair of eyeglasses with a lens-frame body which can be coupled quickly and selectively with either a pair of specific bows or a specific head strap.

Accordingly, the pair of eyeglasses of this invention includes an elongated lens-frame body, two connectors, and a fastener device. The lens-frame body is adapted to rest on the nose of a user and includes two end portions, each of which has a generally vertical hole formed therethrough. Each of the connectors has a front end portion provided with two aligned horizontal locking lugs which are respectively formed with threaded holes therethrough, and a bolt which extends through the threaded holes of the locking lugs and the hole of a corresponding one of the end portions of the lens-frame body so as to hinge the connectors on the end portions of the lens-frame body. The fastener device is coupled detachably with the rear end portions of the connectors so as to retain the lens-frame body on the face of the user.

Each of the connectors has a rear end surface with a generally horizontal receiving bore formed therein, and two aligned integral stop elements each of which is disposed at the rear end of the connector and each of which forms a part of the rear wall of the connector so as to define in the rear end wall a T-shaped opening which has a wide upper section located above the stop elements and a narrow lower section located between the stop elements.

The fastener device includes a pair of one-piece bows, each of which has a front connecting end portion received in the corresponding receiving bore of the corresponding connector, a rear engaging end portion for engaging an ear of the user, and a resilient barb section that has a front end integrally formed with the front connecting end portion and that is inclined rearward and downward from the front connecting end portion. Each of the barb sections is located in the corresponding bore and has a rear end abutting against the stop elements so as to prevent the barb section from rearward movement on the connector, thereby retaining the barb section within the bore of the connector. Each of the bows further has an inclined push section which has a front end integrally formed with the barb section and which is inclined rearward and downward from the barb section in such a manner that the push section can be pushed upward relative to the front connecting end portion so as to move the barb section to a level above the stop elements, thereby permitting removal of the bow from the connector via the wide upper section of the T-shaped opening of the connector. The rear engaging end portions of the bows may be replaced with a head strap which interconnects the front connecting end portions of the bows.

BRIEF DESCRIPTION OF THE DRAWINGS

Other features and advantages of this invention will become more apparent in the following detailed description of the preferred embodiments with reference to the accompanying drawings, in which.

FIG. 4 illustrates how a fastener device is connected to the lens-frame body of the eyeglasses of this invention; and FIG. 5 is a sectional bottom view illustrating interconnection between the fastener device and the lens-frame body of the eyeglasses of this invention.

DETAILED DESCRIPTION OF THE PREFERRED EMBODIMENTS

Figure 1:
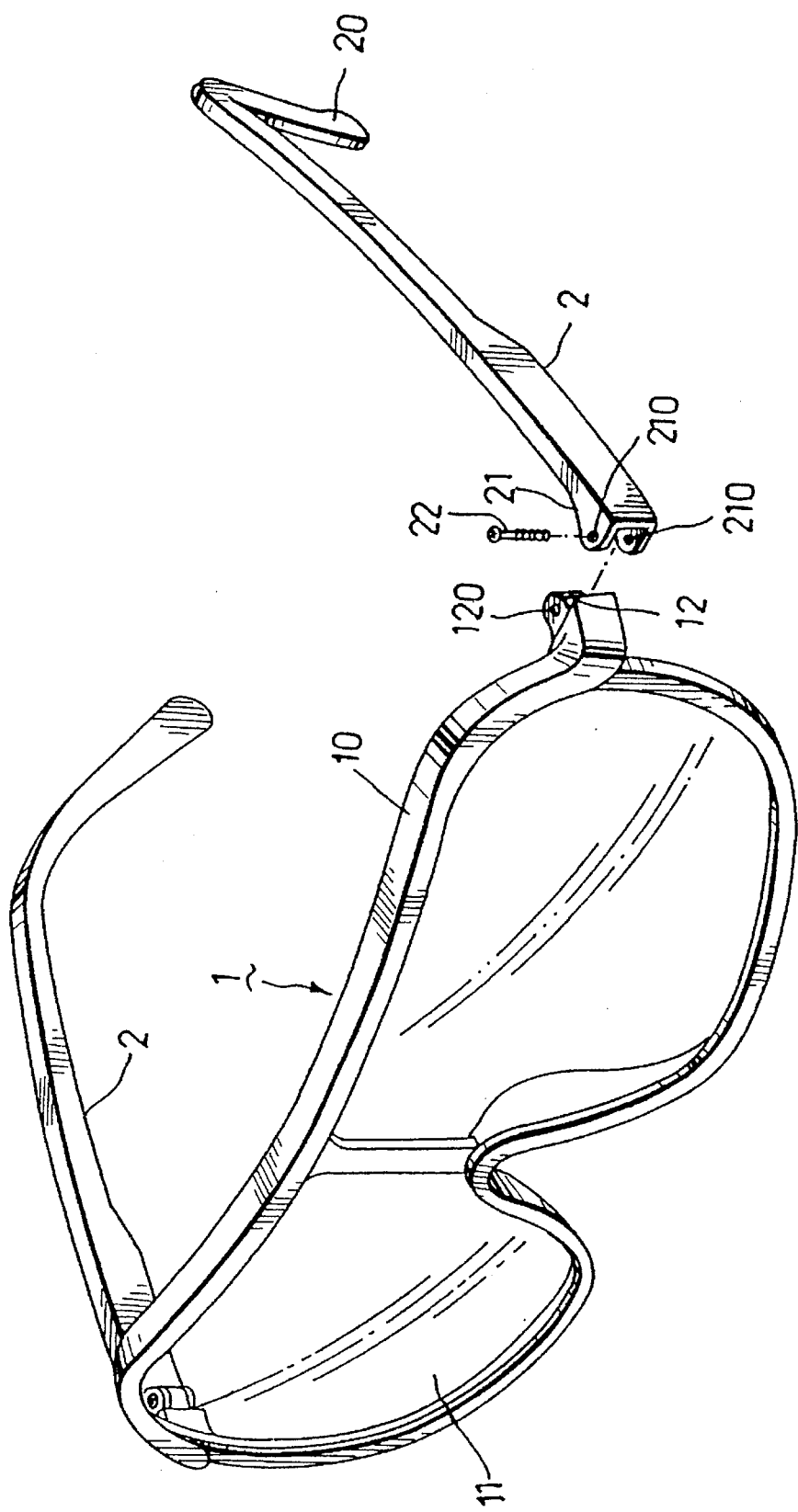
FIG. 1 illustrates a pair of conventional eyeglasses.

Before the present invention is described in greater detail, it should be noted that like elements are indicated by the same reference numerals throughout the disclosure.

Referring to FIG. 1, the first preferred embodiment of a pair of eyeglasses of this invention includes an elongated lens-frame body 3, two connectors 4, and a fastener device. The lens-frame body 3 has a nose bridge 30 installed at an intermediate portion thereof and adapted to rest on the nose of a user and includes two end portions 31, each of which has a generally vertical hole 32 formed therethrough. Each of the connectors 4 has a front end portion 41 provided with two aligned horizontal lugs 411 which are respectively formed with threaded holes 412 therethrough, and a bolt 43, which extends through the threaded holes 412 of the locking lugs 411 and the vertical hole 32 of the corresponding side portion 31 of the lens-frame body 3, so as to hinge the connectors 4 on the end portions 31 of the lens-frame body 3. Each of the connectors 4 has a rear end surface 42 with a generally horizontal receiving bore 40 formed therein, and two aligned integral stop elements 400, each of which forms a part of the rear end wall of the connector 4 so as to define in the rear end wall a T-shaped opening 401 that has a wide upper section located above the stop elements 400, and a narrow lower section located between the stop elements 400. The fastener device includes a pair of one-piece bows 5. Each of the bows 5 has a front connecting end portion 50 inserted into the corresponding receiving bore 40 of the connector 4, and a rear engaging end portion 50A which is adapted to engage an ear of the user (not shown).

Figure 2:
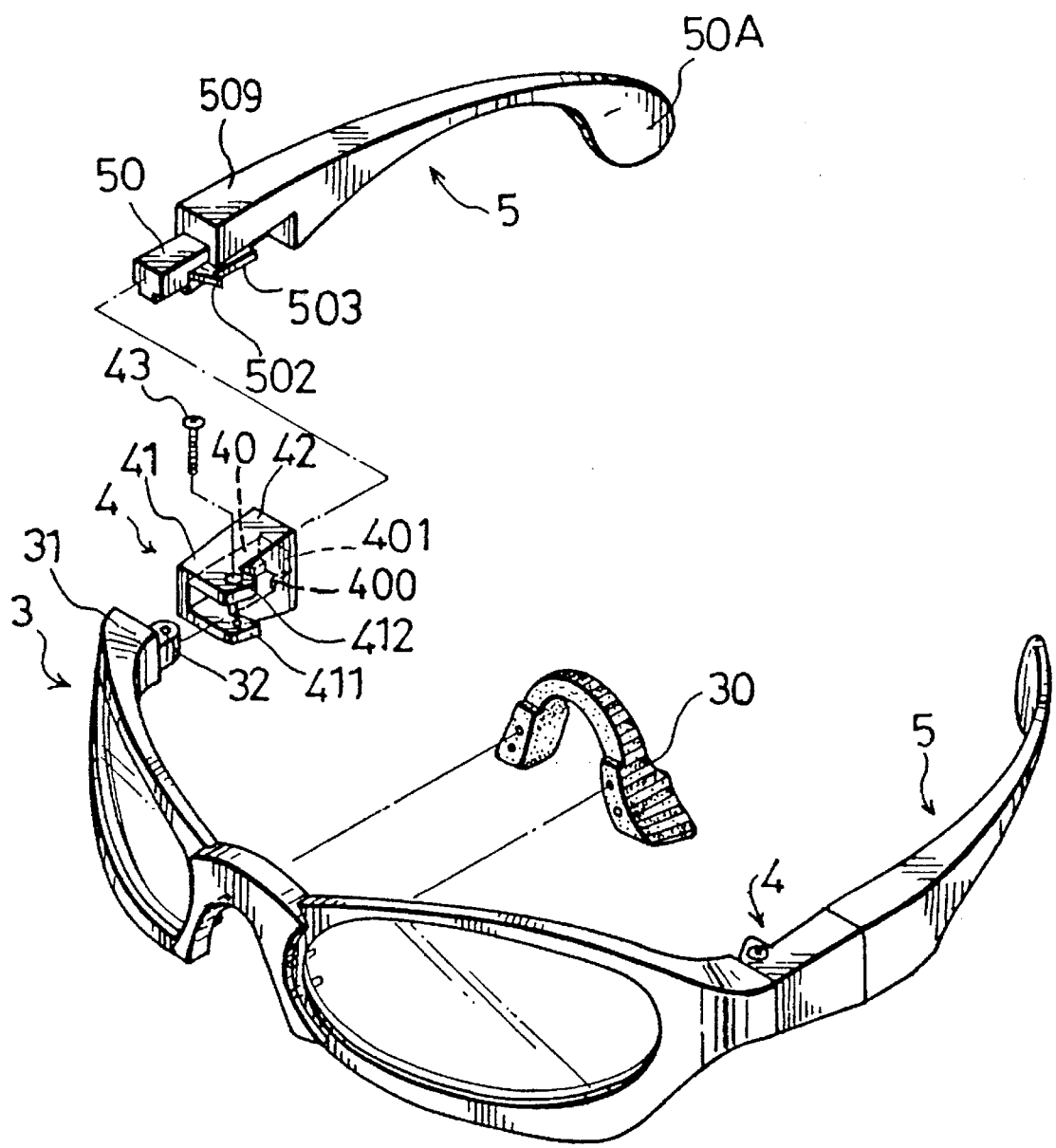
FIG. 2 is a partially exploded view of the first preferred embodiment of a pair of eyeglasses according to is invention.

As best shown in FIGS. 4 and 5, in each of the bows 5, a barb section 502 is integrally formed with the front connecting end portion 50 at the front end thereof and is received in the corresponding bore 40 of the connector 4, in such a manner that the rear end of the barb section 502 abuts against the stop elements 400. Thus, the barb section 502 is blocked by the stop elements 400 from rearward movement in the connector 4, thereby preventing removal of the bow 5 from the connector 4. As illustrated, a push section 503 is integrally formed with the barb section 502 at the front end thereof and is inclined rearward and downward from the barb section 502. As illustrated in FIG. 5, the assembly of the barb section 502 and the push section 503 is generally shaped like an arrowhead. When desired, the push section 503 can be pushed upward toward the top portion 504 (see FIG. 2) of the bow 5 by pressing the push section 503 and the top portion 504 toward each other so as to move the barb section 502 to a level above the stop elements 400. At this time, the barb section 502 can be passed through the wide upper section of the T-shaped opening 401 (see FIG. 2) of the connector 4 so as to remove the bow 5 from the connector 4.

Figure 3:
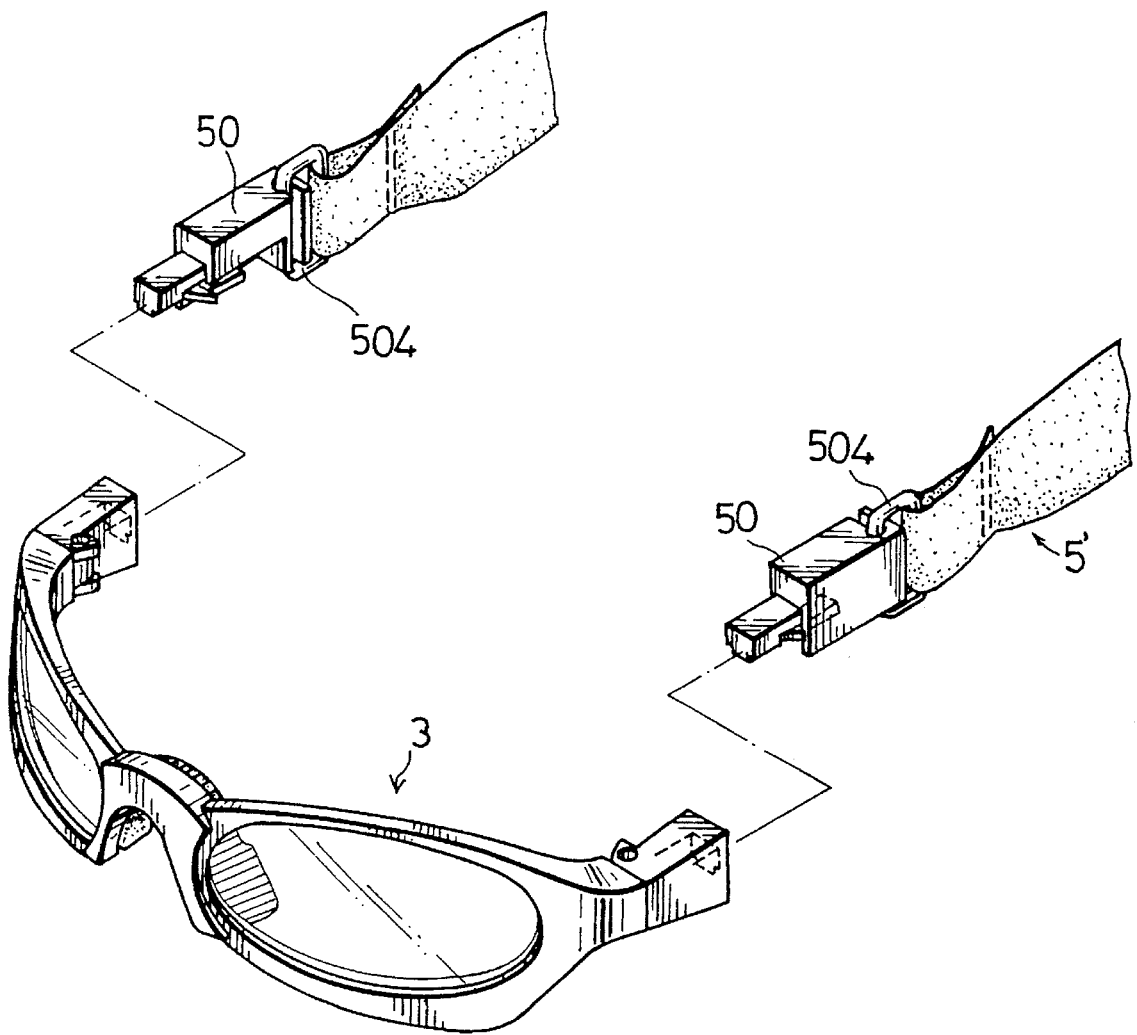
FIG. 3 is a partially exploded view of the second peferred embodiment of a pair of eyeglasses according to this invention.

FIG. 3 illustrates the second preferred embodiment of this invention, which is generally similar to the first preferred embodiment in construction. The only difference resides in that an elastic head strap 5' with two fastener rings 504 is used as a substitute for the rear engaging portions 50A (see FIG. 2) of the previous embodiment so as to interconnect the connecting end portions 50 in order to retain the lens-frame body 3 on the face of the wearer for athletic use.

Thus, the fastener device of the eyeglasses of this invention can be replaced to suit the needs of the wearer in different conditions.

With this invention thus explained, it is obvious to those skilled in the art that various modifications and variations can be made without departing from the scope and spirit thereof. It is, therefore, intended that the invention be limited only as in the appended claims.

I claim:

1. A pair of eyeglasses comprising;

an elongated lens-frame body adapted to rest on the nose of a user and including two end portions, each of which has a generally vertical hole formed therethrough;

two connectors, each of said connectors having a front end portion provided with two aligned horizontal lugs which are respectively formed with threaded holes therethrough, and a bolt extending through the threaded holes of the lugs and the hole of a corresponding one of said end portions of said lens-frame body so as to hinge said connectors on said end portions of said lens-frame body; and a fastener device coupled detachably with rear end portions of said connectors so as to retain said lens-frame body on the face of the user, wherein each of said connectors has a rear end surface with a generally horizontal receiving bore formed therein, a rear end wall, two aligned integral stop elements disposed in two sides of a rear end of said bore and forming parts of the rear end wall of said connector so as to define in the rear end wall a T-shaped opening which has a wide upper section located above said stop elements, and a narrow lower section located between said stop elements, said fastener device including a pair of one-piece bows, each of which has a front connecting end portion received in a corresponding one of said receiving bores, a resilient barb section that is integrally formed with said front connecting end portion at a front end of said barb section and that is inclined rearward and downward from said front connecting end portion, a rear engaging end portion for engaging an ear of the user, and an inclined push section which has a front end integrally formed with said barb section and which inclines rearward and downward from said barb section, each of said barb sections being located in a corresponding one of said bores and having a rear end abutting against said stop elements of a corresponding one of said connectors so as to prevent said barb sections from rearward movement in said bores, thus preventing removal of said bows from said connectors, said push sections of each of said bows being pushable upward on said bow to move said barb section to a level above said stop elements so as to permit passage of said barb section through the upper section of said T-shaped opening of said connector, thereby removing said bow from said connector.

2. A pair of eyeglasses comprising:

an elongated lens-frame body adapted to rest on the nose of a user and including two end portions, each of which has a generally vertical hole formed therethrough;

two connectors, each of said connectors having a front end option provided with two aligned horizontal lugs which are respectively formed with threaded holes therethrough, and a bolt extending through the threaded holes of the lugs and the hole of a corresponding one of said end portions of said lens-frame body so as to hinge said connectors on said end portions of said lens-frame body; and a fastener device coupled detachably with rear end portions of said connectors so as to retain said lens-frame body on the face of the user, wherein each of said connectors has a rear end surface with a generally horizontal receiving bore formed therein, a rear end wall, two aligned integral stop elements disposed in two sides of a rear end of said bore and forming parts of the rear end wall of said connector so as to define in the rear end wall a T-shaped opening which has a wide upper section located above said stop elements, and a narrow lower section located between said stop elements, said fastener device including two connecting end portions respectively received in said receiving bores of said connectors, and an elastic fastener strap portion interconnecting said connecting end portions so as to retain said lens-frame body on the face of the user, each of said connecting end portions having a resilient barb section that is integrally formed with a corresponding one of said connecting end portions at a front end of said barb section and that is inclined rearward and downward from said connecting end portion, and a rear end abutting against said stop elements of a corresponding one of said connectors so as to prevent said barb sections from rearward movement in said bores, thus preventing removal of said connecting end portions from said connectors, each of said connecting end portions further having an inclined push section which has a front end integral formed with the barb section, each of said push sections being pushable upward on said connecting end portion to move said barb section to a level above said stop elements so as to permit passage of said barb section through the upper section of said T-shaped opening of said connector, thereby removing said connecting end portions from said connectors.

* * * * *

UNITED STATES PATENT AND TRADEMARK OFFICE
CERTIFICATE OF CORRECTION

PATENT NO. : 5,594,511

DATED : January 14, 1997

INVENTOR : JEN-CHING LIN

It is certified that error appears in the above-identified patent and that said Letters Patent is hereby corrected as shown below:

COLUMN 3

Line 43, "comprising;" should read --comprising:--.

COLUMN 4

Line 33, "option" should read --portion--.

COLUMN 5

Line 5, "integral" should read --integrally--.

Signed and Sealed this

Eighth Day of April, 1997

BRUCE LEHMAN

Attest:

Attesting Officer

Commissioner of Patents and Trademarks